United States Patent [19]
Quinn et al.

[11] Patent Number: 5,629,510
[45] Date of Patent: May 13, 1997

[54] BAR CODE SCANNING AND READING APPARATUS WITH AN OSCILLATING SCANNING ENGINE

[75] Inventors: Anna M. Quinn, Rochester; Jay M. Eastman, Pittsford, both of N.Y.

[73] Assignee: PSC Inc., Webster, N.Y.

[21] Appl. No.: 332,205

[22] Filed: Oct. 31, 1994

Related U.S. Application Data

[63] Continuation-in-part of Ser. No. 320,888, Oct. 5, 1994, abandoned, which is a continuation-in-part of Ser. No. 138,313, Oct. 18, 1993, Pat. No. 5,422,472, which is a continuation-in-part of Ser. No. 985,371, Dec. 4, 1992, abandoned.

[51] Int. Cl.⁶ ................................................. G06K 7/10
[52] U.S. Cl. ............................................ 235/462; 235/472
[58] Field of Search ............................. 235/462, 472, 235/467; 359/196, 197, 198, 199

[56] References Cited

U.S. PATENT DOCUMENTS

| | | | |
|---|---|---|---|
| 5,015,831 | 5/1991 | Eastman | 235/462 |
| 5,115,120 | 5/1992 | Eastman | 235/462 |
| 5,254,844 | 10/1993 | Krichever | 235/462 |
| 5,392,150 | 2/1995 | Inagaki | 359/221 |

*Primary Examiner*—Donald T. Hajec
*Assistant Examiner*—Karl D. Frech
*Attorney, Agent, or Firm*—Joseph F. Murphy

[57] ABSTRACT

An improved miniature scanning module for scanning and reading data fields having images or symbols such as bar codes, adapted to be included in a scanning application such as a portable transaction terminal. The scan engine of the module has an oscillator apparatus in which at least one side of a vertical coil cuts lines of magnetic force from an independent fixed magnet assembly and has a rotor and a stator which are molded interconnect devices in which electrical circuits are formed by surface plating or printing during multiple-shot molding of the parts. The rotor is supported by a plurality of metal alloy flexures depending from the stator, which flexures both mechanically support the rotor and transmit electrical power and signals between control circuitry on one or more printed circuit boards on the stator and electrical elements on the rotor. A semiconductor laser diode mounted on the rotor scans in one dimension when the rotor oscillates. A collection optic such as a parabolic mirror mounted on the rotor adjacent to the scanning laser also oscillates with the rotor and collects and directs return light to a photodetector mounted on the stator at the focal point of the collection optic. The flexures define an axis passing through the photodetector, about which the rotor oscillates, and thus return light from which data representing bar codes can be derived is detectable at all angles of oscillation.

23 Claims, 14 Drawing Sheets

BAR CODE SCANNING AND READING APPARATUS WITH AN OSCILLATING SCANNING ENGINE

This application is a continuation-in-part (CIP) of U.S. patent application Ser. No. 08/320,888 filed Oct. 5, 1994 now abandoned, which is a CIP of U.S. patent application Ser. No. 08/138,313 filed Oct. 18, 1993 now U.S. Pat. No. 5,422,472, which is a CIP of U.S. patent application Ser. No. 07/985,371 filed Dec. 4, 1992 now abandoned, and provides improvements to bar code scanning and reading apparatus and assembly and actuation devices which are described and claimed therein.

The present invention relates to improved optical scanning and reading apparatus having several improvements, namely improved oscillation means, simplified layout of optical elements, and improved arrangements of electrical pathways resulting in a smaller, lighter, more durable rotor (or oscillatory) assembly which scans an optical beam, than heretofore available and particularly to a miniature scan engine or module wherein these improvements are incorporated. The term scan engine or module, as used herein, may be taken to mean a unitary assembly of a light beam source, a mechanical deflector for steering the beam from the light source, and optical and electronic components for collecting and translating light received from a symbol (e.g., a bar code) into data-representing electrical signals.

The present invention is especially suitable for use in optical apparatus such as bar code scanners and readers which require minimal space or where minimal space, for example, approximately one cubic inch in volume, is available for the bar code scanning and reading facilities. The invention provides improvement in electro-mechanical oscillator design wherein alternating current passing through opposite sides of a single coil cuts lines of magnetic force from two fixed, spaced-apart magnets, providing a period of oscillation equal to the period of the current alternation in the coil. The invention further provides improvement in simplicity and durability of electrical conductors through two-step insert molding of plateable plastic elements within the bodies of a stator and a rotor. The invention further provides improvement in weight reduction of the rotor by locating the photodetector on the stator and collecting and focusing on the photodetector the light returning from the scanned object by means of a collection optic on the rotor such as, for example, a tilted parabolic mirror or a suitably designed parabolic grating, or diffractive collector as described in the above referenced applications.

A unitary rotor assembly including the collection optic and a laser may be rotatably mounted on flexures and electro-mechanically oscillated to scan the laser beam across a field of view where an object or symbol to be scanned (e.g., a bar code) may be located. Return light from the object or symbol is collected by the optic and presented to the detector in the collection region defined by the optic. Collection optics and bar code scanning devices are described in the above-referenced applications, which devices utilize diffractive elements on the rotor for guiding and concentrating light, especially light returned from a bar code.

As smaller light sources, particularly semiconductor lasers capable of developing high illumination intensity levels, have become available, bar code scanning devices have been reduced in size. An avenue for size reduction has been in the manner in which the light source and associated photodetectors are mounted. U.S. Pat. Nos. 5,015,831 issued to Eastman et al., on May 14, 1991 and 5,115,120 issued to Eastman on May 19, 1992, illustrate scan engines using flexural mounts for an oscillating rotor. Such mounts have facilitated miniaturization of a scan engine by enabling the laser diode and associated photodetector to be mounted on a rotor which can be reciprocally oscillated to scan the light beam across a bar code symbol. Further progress toward miniaturization requires simplification and reduction of size and weight of the rotor. It is a feature of the invention to provide a scan engine having a lighter, simpler rotor, the photodetector being located on the stator.

Data collection systems incorporating bar code scanners as a means for collecting data for processing or storage are widely used for inventory and stock management, as well as point of sales data collection. These systems, sometimes called data collection or transaction terminals, may be used by themselves to independently collect the data and even process it. Such independent terminals may be miniature in size, limited only by the size of the display which is desired and the area desired for the keys of the keypad or keyboard thereof; the computerized data storage and collection facilities and batteries requiring only limited space. Bar code readers may also be used by themselves and connected by cables or radio links to separate or remote terminals. Also, it is desirable at times to utilize a remote terminal or cash register terminal, to which the bar code reader may be linked, or to combine the reader with the portable terminal. The size of the bar code reading device has been a limitation upon the overall size and volume of an integrated bar code reading and data collection assembly (i.e., the portable transaction terminal). A portable transaction terminal where the data collection unit acts as the handle when assembled with a scan engine unit is described in the above referenced U.S. Pat. No. 5,115,120.

It is a feature of the present invention to provide an improved bar code reading scan engine or module which may be integrated with a data collection or processing unit to provide a portable terminal. The use of a miniature bar code scan engine in accordance with this invention facilitates the incorporation thereof into a data collection and processing unit which can be in a handle of a housing which also provides a receptacle for the scanner module, thus providing an improved miniature portable transaction terminal.

A challenge of miniaturization design is to reduce elements in size and weight without reducing ruggedness, durability, and reliability. Our approach to reducing weight is to eliminate discrete wiring runs and instead use plated or printed surface conductors for surface connections. Electrical pathways through the rotor body (and the stator body as well) can be formed on plateable plastic preforms which become structural elements of the rotor body. Such an element may be precast in a first molding step, the electrical pathways being established by the form molded, and the element is then insert molded in a second molding step within non-conductive structural plastic by known techniques to form the fully molded rotor body. The two-shot element is then put through the plating process where only the first shot accepts the plating. Such a molded component is known as a molded interconnect device (MID). Techniques for forming such circuits are offered by Mitsui-Pathtek Corporation, 25 Metro Park, Rochester, N.Y. 14623. It is a feature of the invention to provide a scan engine wherein the rotor and stator bodies are MID's and electrical pathways within the MID's are defined by molded preforms formed from plateable plastic.

As previously noted, simplification of scan engine design is needed for further miniaturization of scan engines. Previous designs using flexures to permit oscillation of the rotor with respect to the stator have had complex, often crossing, flexures to permit proper arcs of oscillation. It is a feature of the invention to provide straight, non-crossing flexures which permit the full required range of oscillation of the rotor and which define an axis of rotation containing the focal point of the parabolic collector at all angles of oscillation.

Accordingly, objects of the invention include any or all of the following:

a) to provide improved optics for collecting and detecting light from optical symbols (bar codes) effectively and efficiently while minimizing the physical space (volume) and mass (rotor weight) required for the light collection function;

b) to provide improved scan engines and modules which are rugged, lightweight, and reliable by virtue of having electrical pathways integrally molded within their rotors and stators;

c) to provide improved devices for reading such optical symbols including scan engines and modules which incorporate such improved light collection optics and rotors and thereby may be miniaturized; and d) to provide improved transaction terminals for data collection with optical symbol (bar code) reading capabilities, which can be miniaturized.

Briefly described, the invention provides an improved miniature scan engine suitable for use in a scanning accessory which may be used with (or separately from) a terminal unit to provide a portable data collection or transaction terminal system for collecting and entering data by optically reading data representing symbols. The scan engine in accordance with an embodiment of the invention contains a stator having one or more printed circuits and optionally one or more logic microchips for controlling the operation of the scan engine, two spaced apart permanent magnets, and a photodetector for receiving collected light returning from a scanned symbol. The scan engine also contains a rotor disposed on a plurality of flexures which are also attached to the stator, which disposition permits the rotor to oscillate about an axis which passes through the photodetector on the stator. The flexures are electrically conductive as well as supportive and carry power and electrical signals from the stator to elements on the rotor. The rotor has a coil disposed orthogonal to the magnetic field of the stator magnet assembly so that opposite sides of the coil cut independent magnetic fields. The rotor has a semiconductor laser disposed to mechanically scan a one-dimensional path when the rotor oscillates. A collection optic, preferably a parabolic mirror, is disposed on the rotor to collect light returning from a scanned symbol and is tilted away from the incoming direction of the returned light to reflect the light to the photodetector on the stator. Positioning the photodetector on the stator simplifies the wiring and conductor requirements of the rotor, since the return signal in the photodetector is generated on the stator and thus no signal return conductor for the photodetector is required between the rotor and the stator. The rotor body, and preferably also the stator body, is fabricated using molded interconnection device techniques so that all electrical pathways are molded in, with no wiring, connectors, or crimped junctions. The terminal pads of the molded interconnect pathways are plated, preferably with a combination of copper, nickel and gold, and leads from the laser diode and the coil preferably are soldered directly to the plated pads.

The scan engine may be miniaturized so as to occupy a volume less than 1.25 cubic inch, for example, with a width and length of 1.5×1.0 inch and a thickness less than 0.8 inch.

The scan engine module facilitates the disposition of the scanning function of the terminal in a detachable handle as described in the parent application referenced above, as well as facilitating design of other miniaturized bar code reading scanning devices which may be attached to the back of the hand of an operator, in his or her helmet, as in U.S. Pat. No. 5,212,372 issued May 18, 1993 to Quick et al. and U.S. Pat. No. 5,228,449 issued May 4, 1993 to Eastman et al., or elsewhere where space is limited.

The foregoing and other objects, features, and advantages of the invention, as well as presently preferred embodiments thereof, will become more apparent from a reading of the following description in connection with the accompanying drawings in which.

Figure 1:
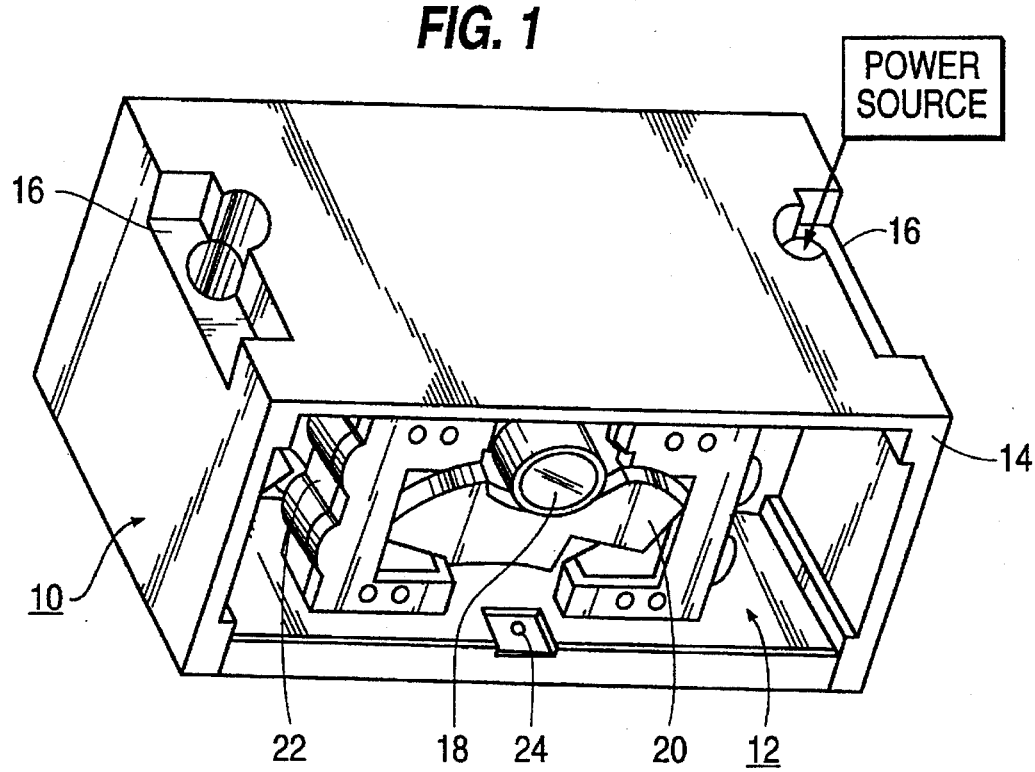
FIG. 1 is a front isometric view from above of an assembled scanning module in accordance with the invention.
Figure 2:
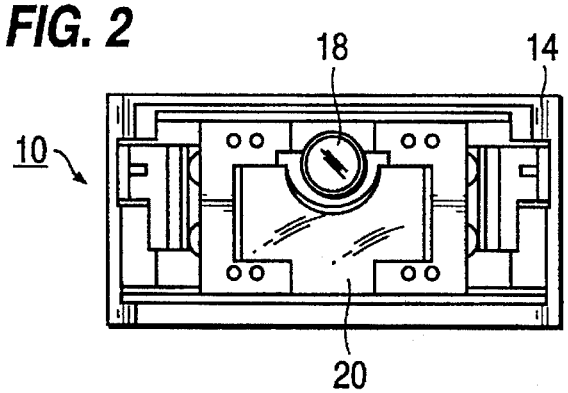
FIG. 2 is a front view of the scanning module of FIG. 1.
Figure 4:
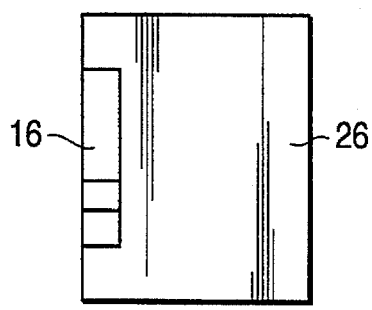
FIG. 4 is a side view of the scanning module of FIG. 1.
Figure 3:
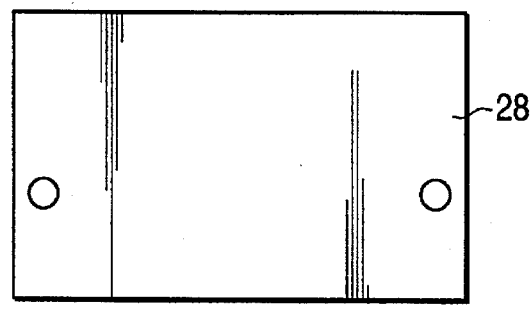
FIG. 3 is a top view of the scanning module of FIG. 1.
Figure 17:
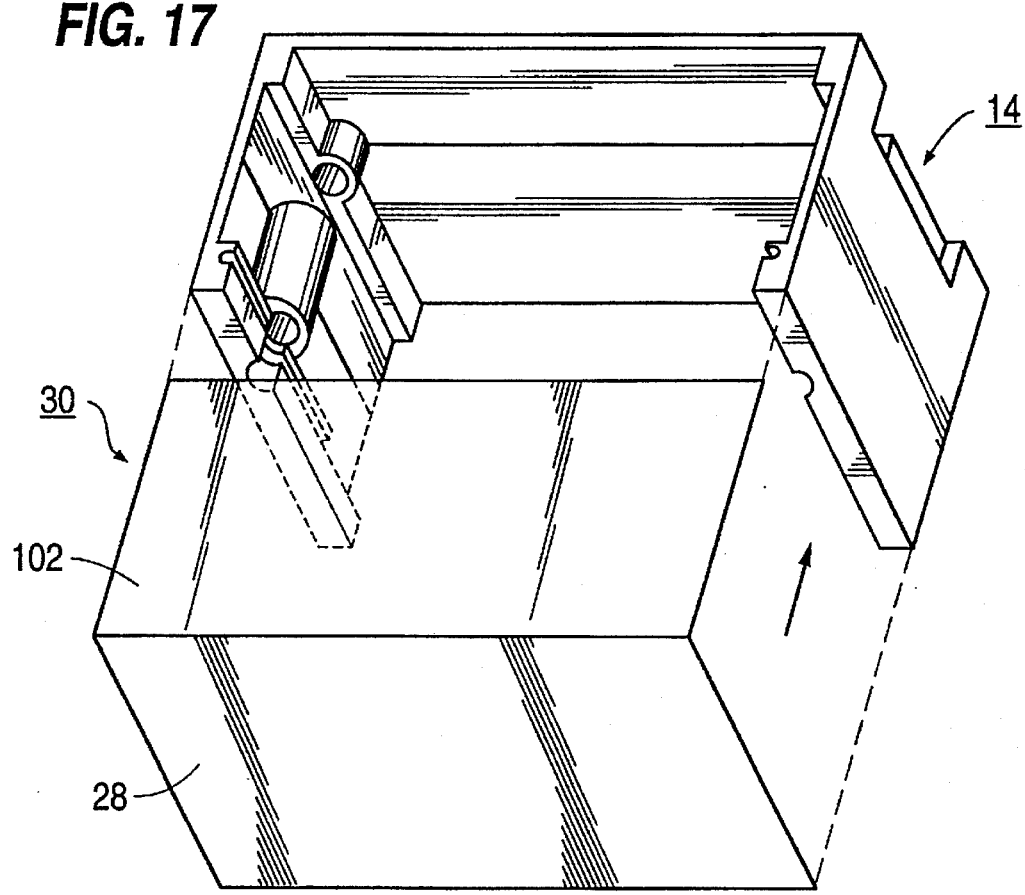
FIG. 17 is a rear isometric view from below, showing the shielding and cover of the scanning module of FIG. 1.
Figure 18:
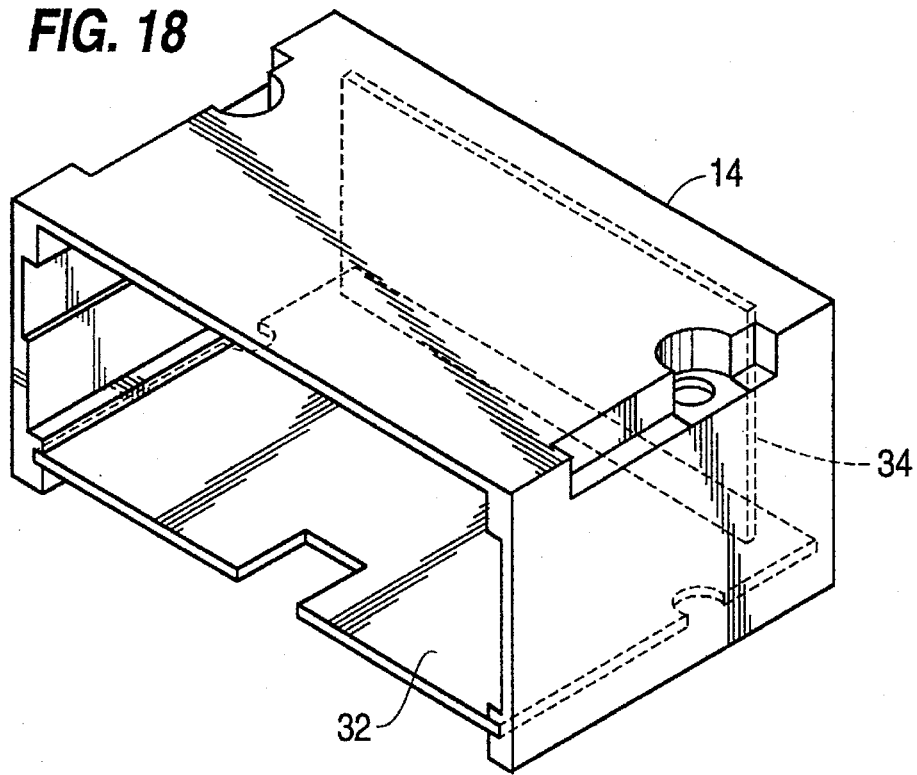
FIG. 18 is a front isometric view from above showing the placement of the two circuit boards in the case of the scanning module of FIG. 1.

Referring to FIGS. 1 and 2, there is shown an improved scanning unit 10 in accordance with the invention for scanning and reading symbols, especially bar codes. Scan engine module 12 is disposed within housing 14 which has recesses 16 by which scanning unit 10 can be mounted into an application device such as, for example, a portable transaction terminal (not shown). Electrical connection to a terminal can be made through recesses 16 or by other means such as electrical leads or connectors (not shown). Housing 14 can be formed of plastic and is preferably plated with metal for reasons of shielding the scan engine from stray electromagnetic radiation which improves the signal-to-noise ratio thereof. The forward end of housing 14 is open to permit unimpeded scanning and return light collection by scan engine 12. Semiconductor laser diode unit 18 and parabolic collection mirror 20 are mounted on rotor body 22, as is discussed in more detail hereinbelow. Also shown in FIG. 1 is stationary photodetector 24 which is positioned to receive reflected light from mirror 20, and is preferably at the focal point thereof. Photodetector 24 can be any conventional photosensitive element having high gain such as, for example, a photodiode or a phototransistor, and is preferably mounted directly on and connected to the circuitry of first circuit board 32. Housing 14 has sides, such as left side 26 shown in FIG. 4, and a bottom 28 which bottom is part of metal radiation shield 30 shown in more detail in FIG. 17. Housing 14 is about 1.5 inches wide, about 1.0 inch high, and about 0.75 inch deep, having therefore a volume of less than 1.25 cubic inches.

Figure 5:
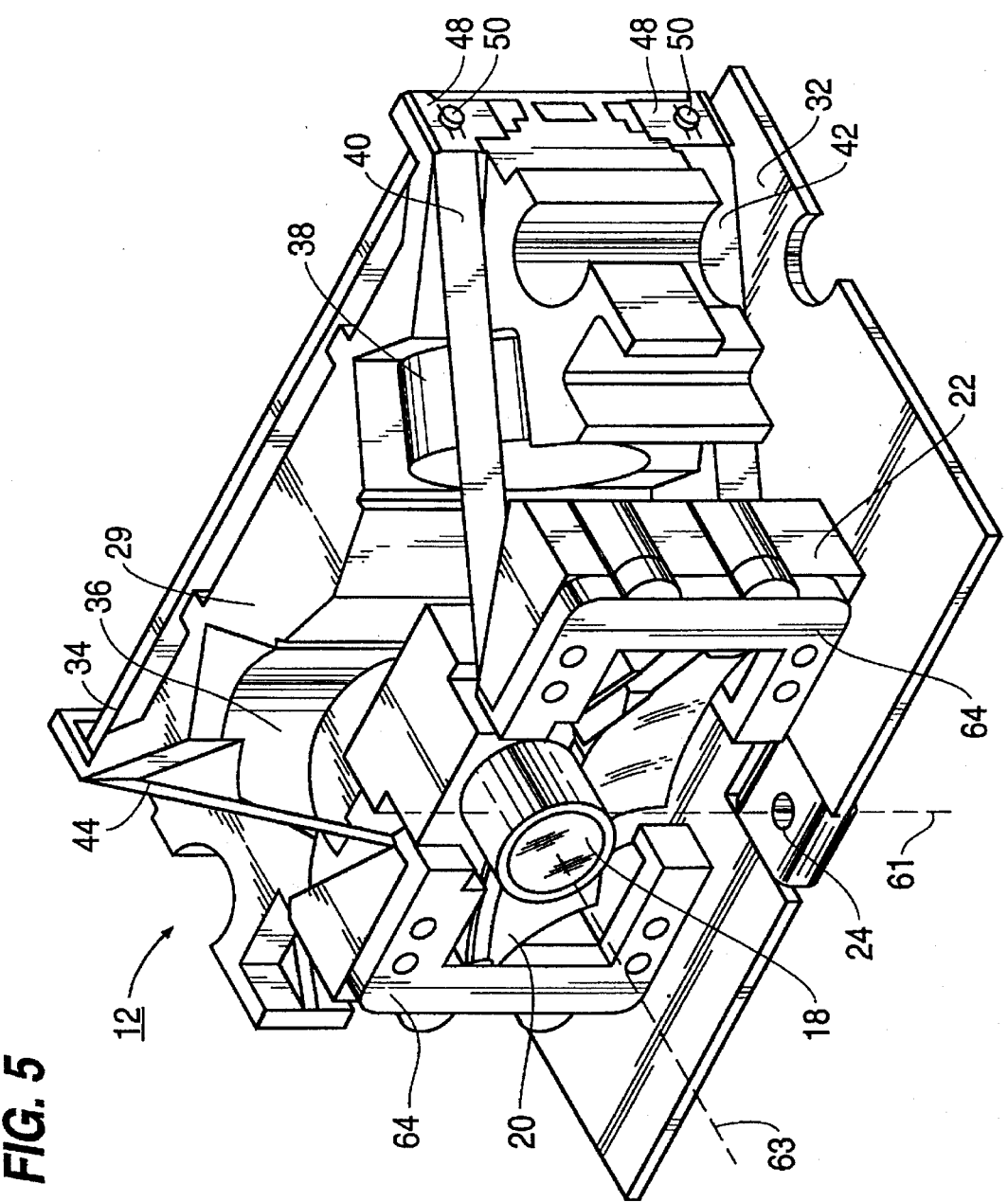
FIG. 5 is a front isometric view from above of the scanning module of FIG. 1 with its cover and shielding removed.
Figure 6:
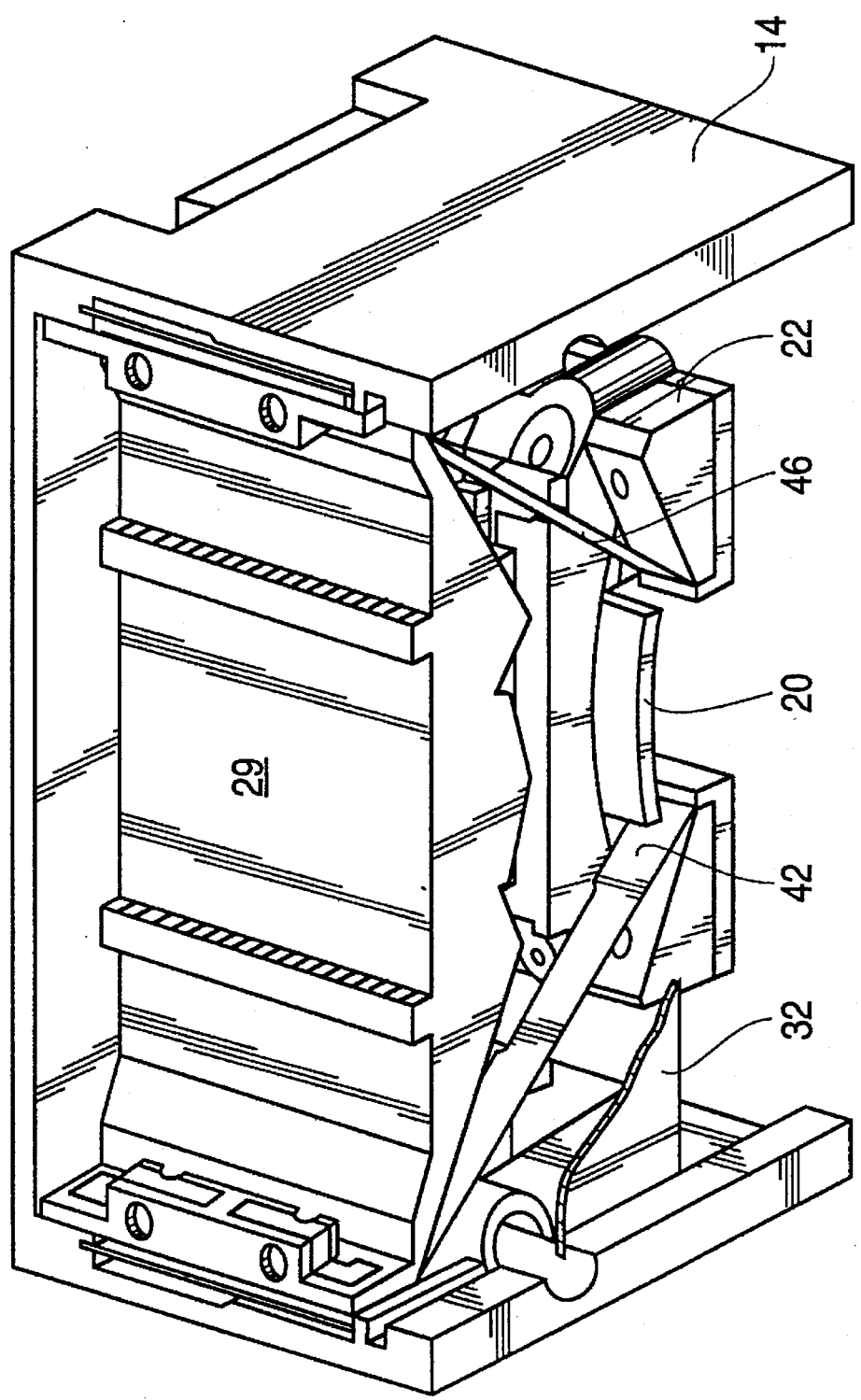
FIG. 6 is a rear isometric view from below of the scanning module of FIG. 1 with its shielding and circuit boards removed to show the layout of the stator, flexures, and rotor.
Figure 7:
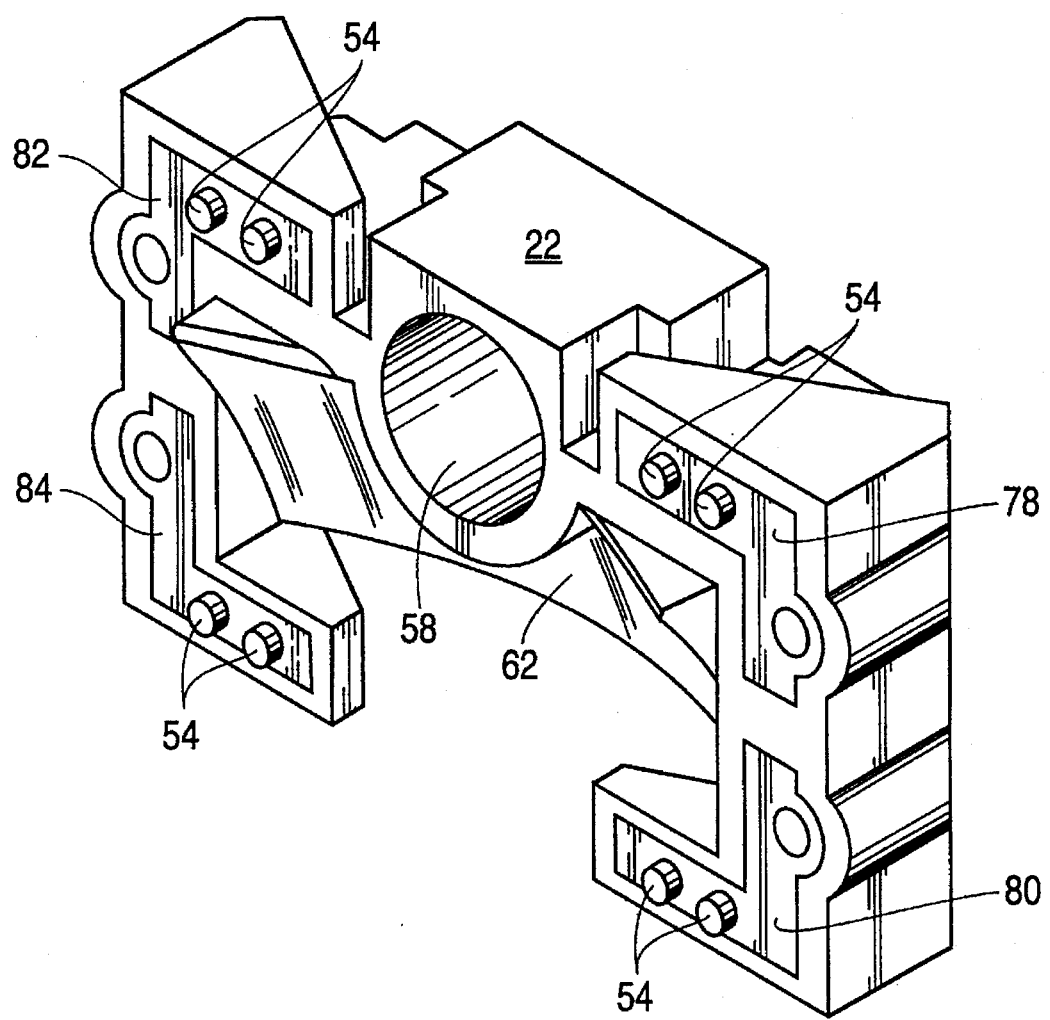
FIG. 7 is a front isometric view from above, showing the fully molded rotor body of the scanning module of FIG. 1.

The scan engine 12 itself is shown completely assembled in FIG. 5 (the rotor coil 39, to be discussed hereinbelow, is omitted from FIG. 5 for clarity of the drawing). A description of the mechanical assembly of engine 12 follows. A stator body 29 has mounted on it first and second printed circuit boards 32 and 34, first and second independent, preferably identical, fixed magnets 36 and 38 having converging magnetic poles, and four flexures 40, 42, 44, and 46 (flexure 46 not visible in FIG. 5). The flexures are formed from preferably an electrically conductive spring-metal alloy, preferably beryllium/copper, and are preferably gold-plated to ensure low-impedance connections and transmission of electrical impulses through the flexures. The flexures also may be of the type shown in U.S. Pat. No. 5,015,831. The stator end of each flexure is formed into a jam clip 48 which lockingly engages post 50 by which means all four flexure ends are attached to stator body 29.

Figure 9:
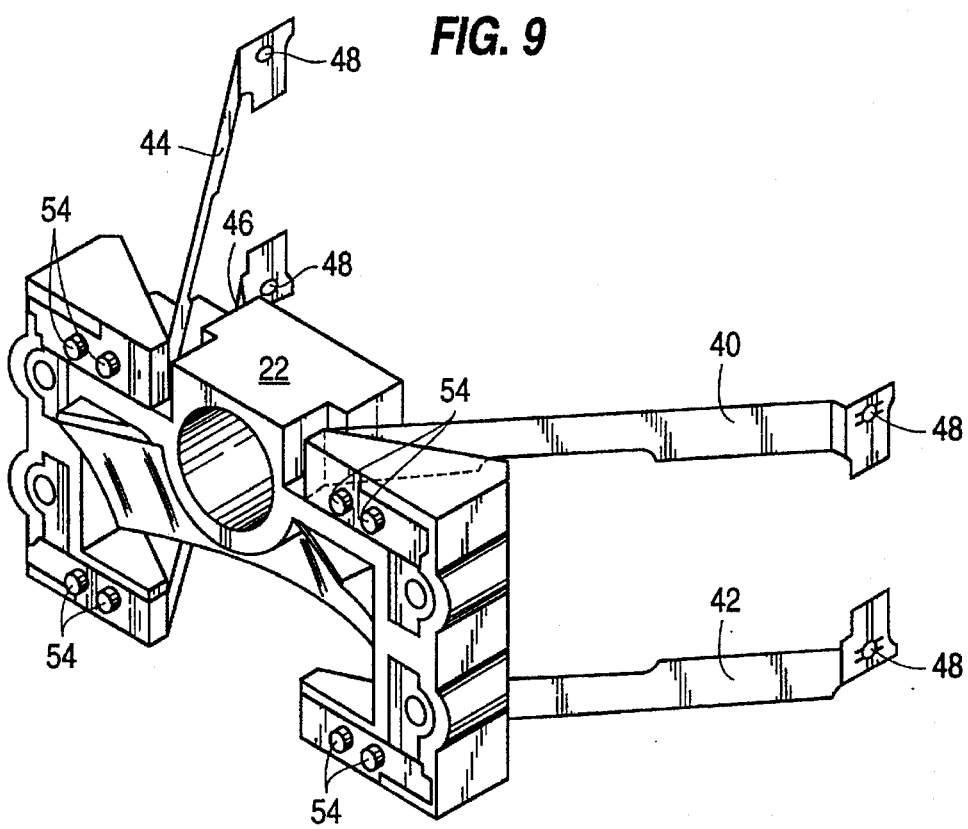
FIG. 9 is an isometric view from the front of the fully molded rotor body of the scanning module of FIG. 1, showing attachment of the four flexures to the rotor body.

Supported by the flexures at their forward end is rotor body 22 and components mounted thereon. The flexures are fastened to rotor body 22 each by two jam clips 52 like clips 48 which lockingly engage posts 54 (not visible in FIG. 5 but shown in FIGS. 9 and 10).

A scanning light source, preferably a semiconductor laser diode unit 18, is disposed in a stepped central bore 58 in rotor body 22, shown in FIGS. 7–11 and 14 and 16. Quadrilaterally disposed ridges 60 retain laser diode unit 18 within bore 58 by friction.

Figure 8:
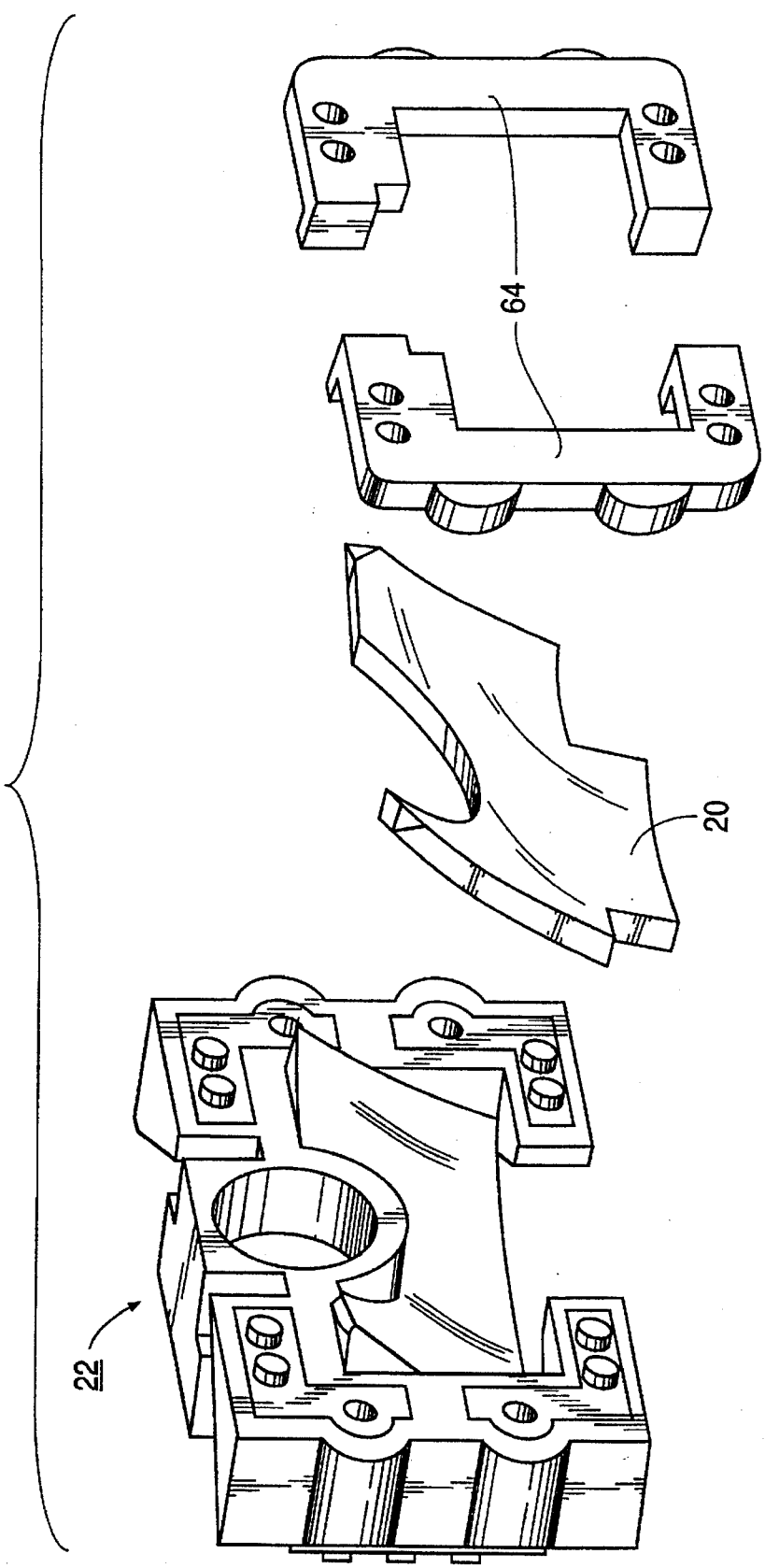
FIG. 8 is an exploded isometric view from the front, showing the fully molded rotor body, parabolic mirror, and molded rotor retainers.
Figure 10:
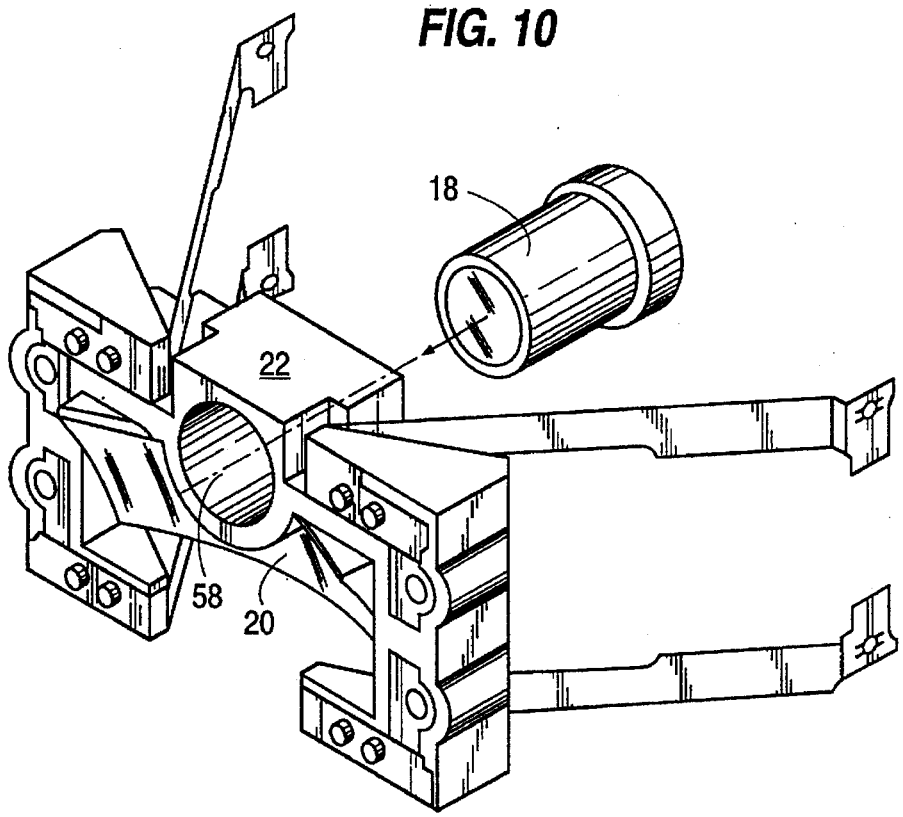
FIG. 10 is an isometric view like FIG. 9, showing the installation of the parabolic mirror and the semiconductor laser unit.
Figure 11:
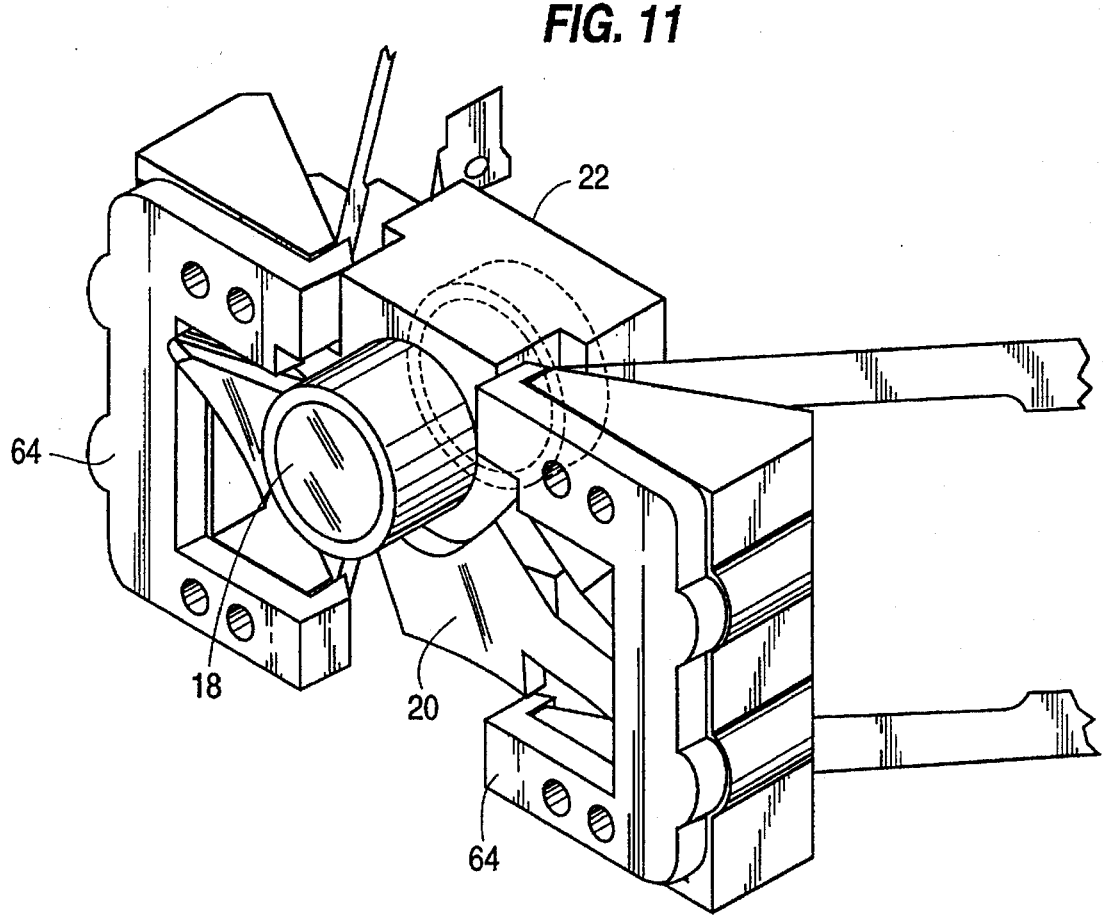
FIG. 11 is an isometric view like FIG. 10, showing the installation of the molded rotor retainers over the attached flexure flanges and surface circuitry.
Figure 12:
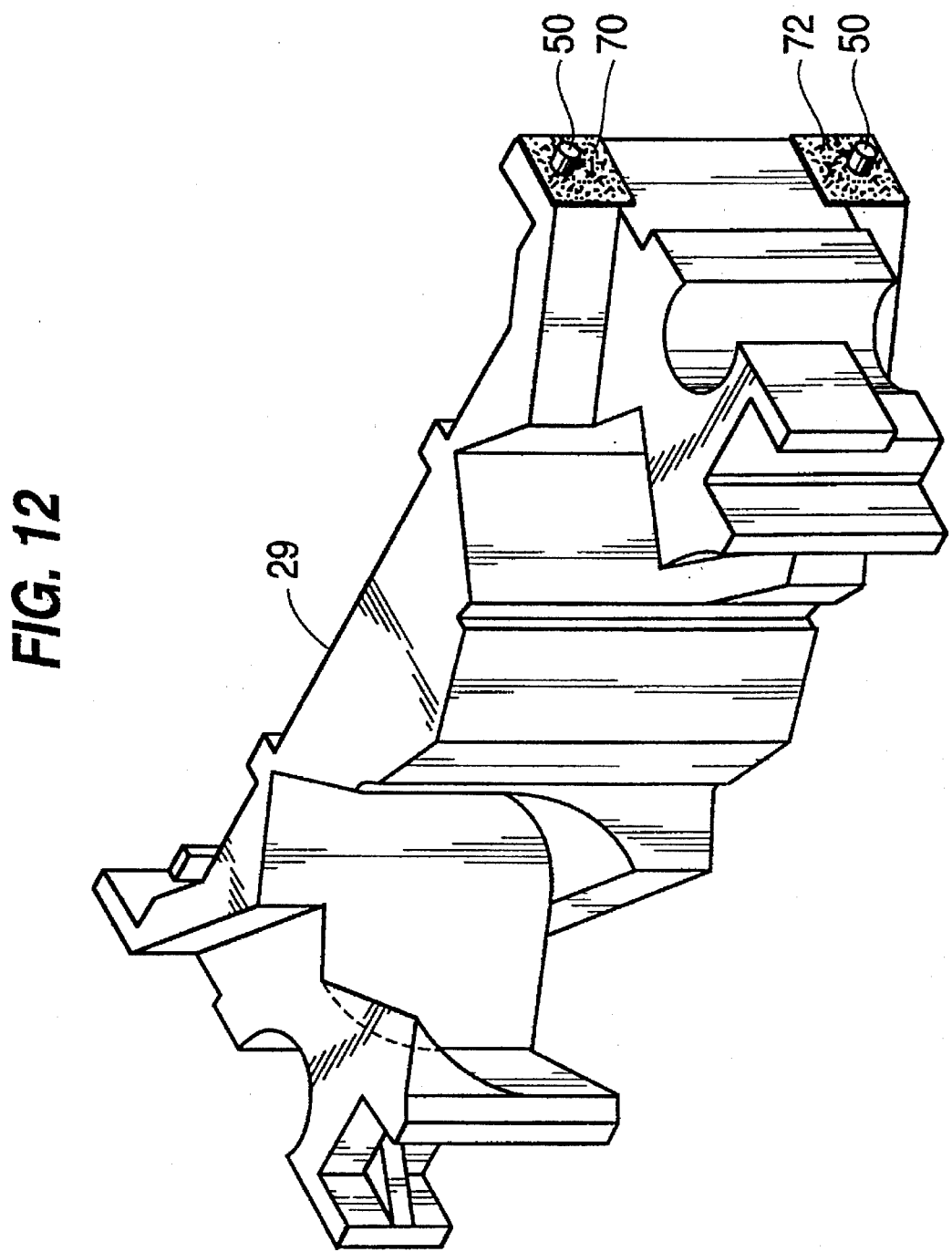
FIG. 12 is an isometric view from the front of the fully molded stator body of the scanning module of FIG. 1.

Rotor body 22 is adapted with surface 62 to receive parabolic mirror 20 as shown in FIGS. 8 and 10 which is affixed as by adhesives to surface 62, which surface is tilted relative to the optic axis 63 of laser diode unit 18 such that scanning return light impinging on mirror 20 is reflected to photodetector 24 and preferably is focussed thereon by the design curvature of mirror 20. The flexures are arranged so that rotor body 22 oscillates about an axis of rotation 61 which passes through photodetector 24. Thus the return light impinges on the photodetector at all angles of oscillation.

Figure 13:
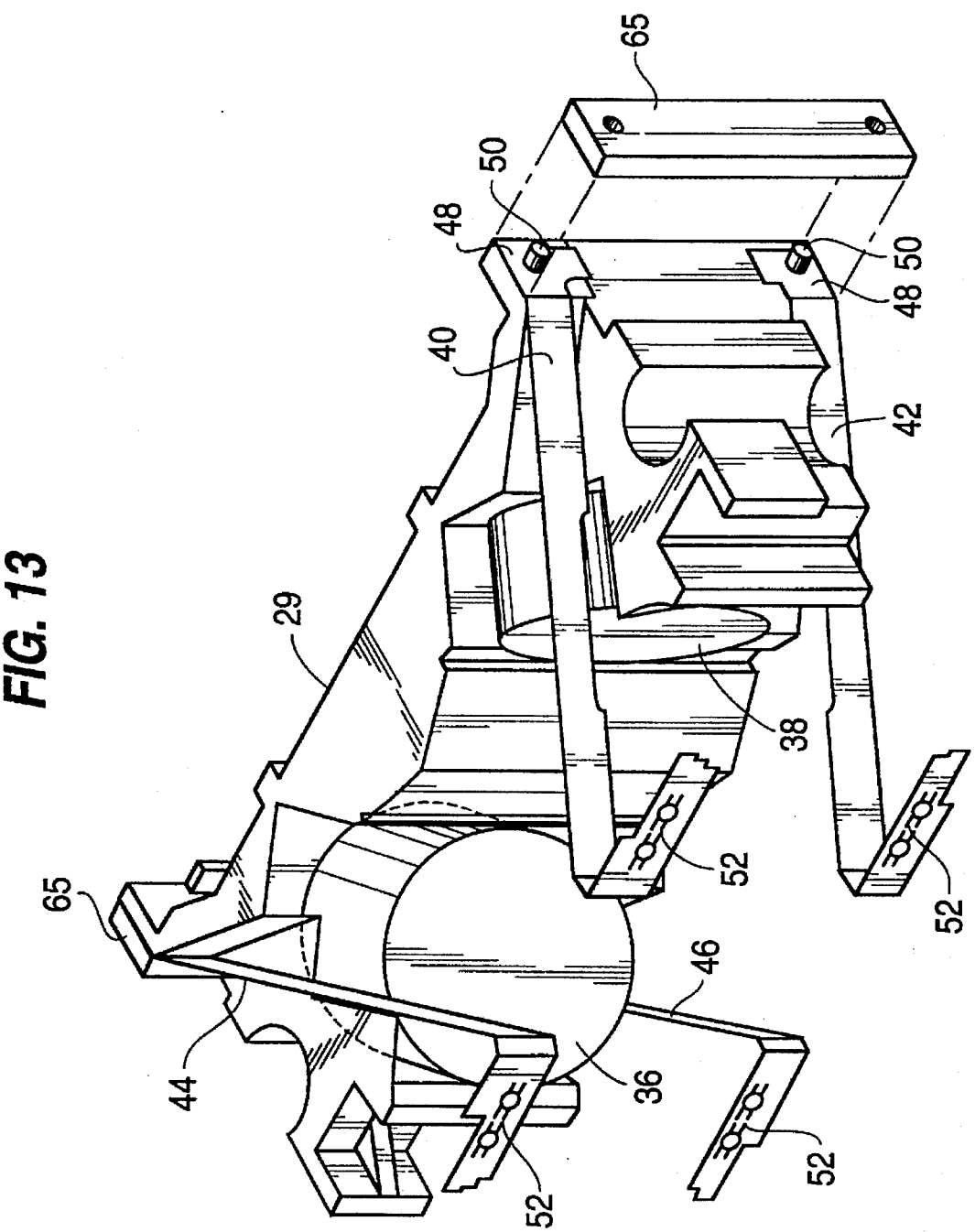
FIG. 13 is an isometric view like that of FIG. 12, showing the installation of the two permanent magnets, the attachment of the four flexures, and placement of the molded stator retainers.
Figure 14:
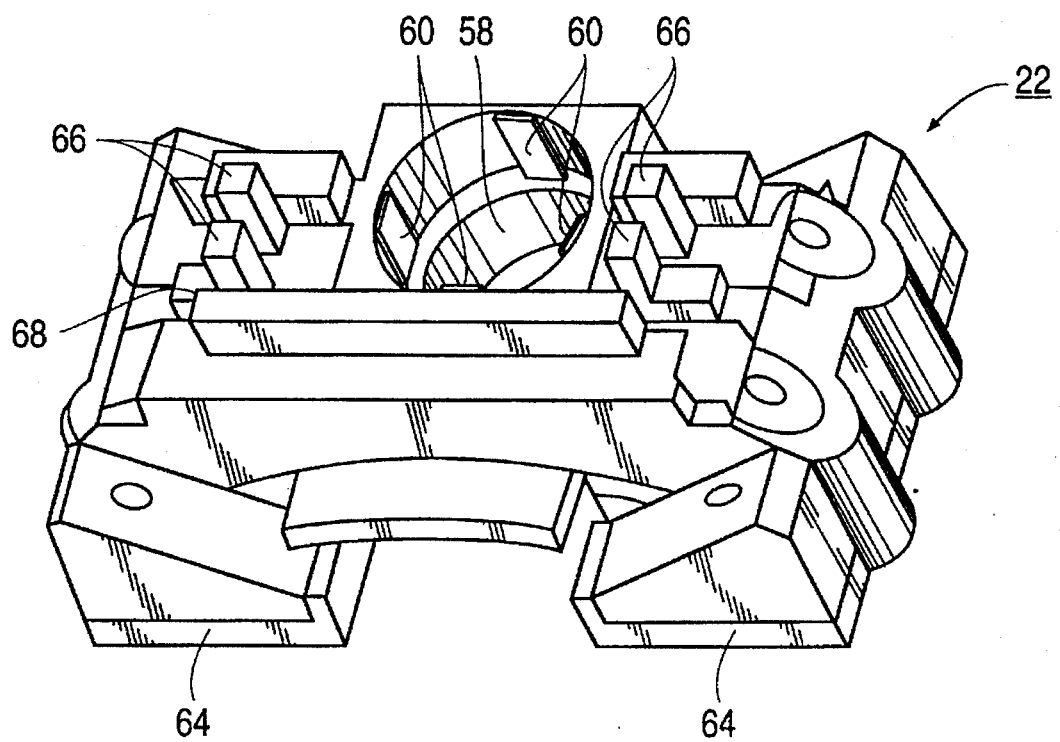
FIG. 14 is a rear isometric view from below of the fully molded rotor body of FIG. 7.
Figure 15:
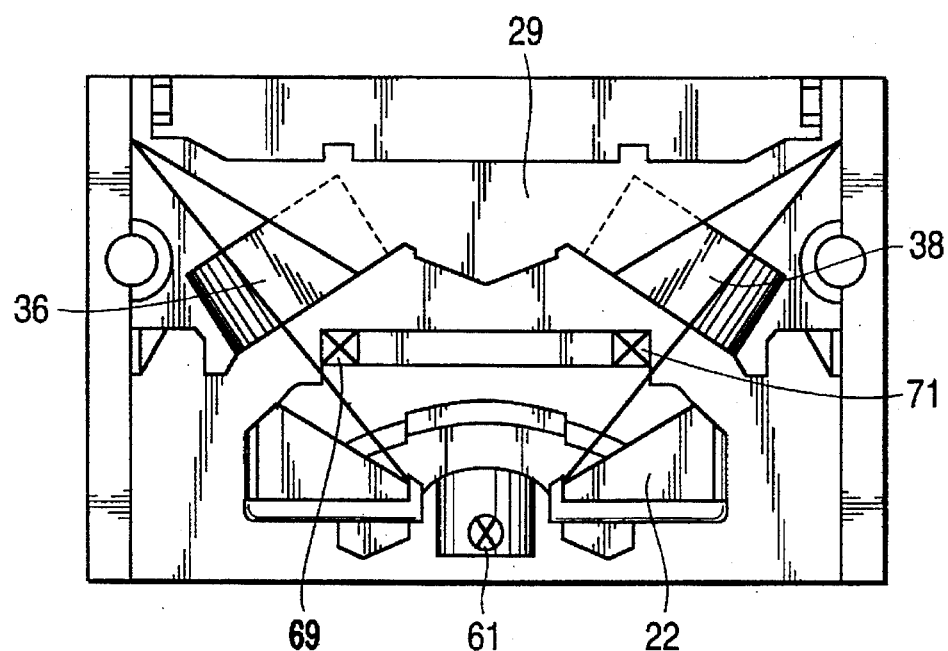
FIG. 15 is a plan view from below of the scanning module of FIG. 1 with the shielding and circuit boards removed to show the principal functional components.
Figure 16:
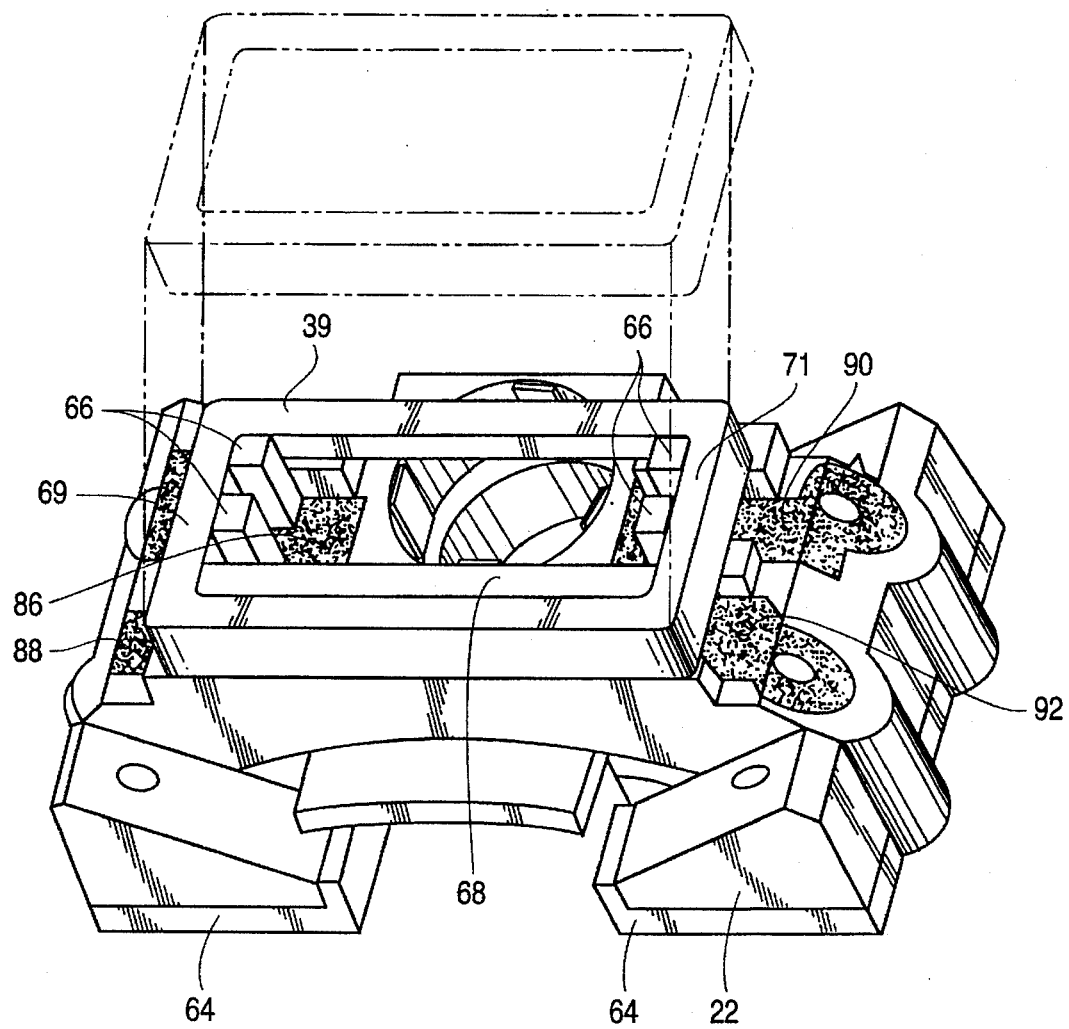
FIG. 16 is an isometric view like that of FIG. 14, showing the placement of the coil on the rotor body.

After the four flexures have been attached to rotor body 22 as described hereinabove, the attachment points are covered by molded rotor retainers 64 as shown in FIGS. 8–11. Plastic posts 54 are accessible through holes in retainers 64 and are secured to the retainers as by ultrasonic welding. On the stator, similar retainers 65 are installed over the stator attachment points as shown in FIG. 13.

Oscillation coil 39 is mounted on the back of rotor 22 in a plane which is perpendicular to optic axis 63 and is held by friction on bayonets 66 and bracket 68 as shown in FIGS. 14–16 and 19. Coil 39 is a conventional multi-turn copper wire coil having two leads, the attachment of which is described hereinbelow. Coil 39 is disposed such that the vertical segments of the coil, 69 and 71, are intersected at their midpoints by the polar axes of magnets 36 and 38, respectively, so that each such segment cuts independent and equal magnetic fields. Two magnets are shown to allow a short time to initiate scanning. If start-up time is not important, as in continuous scanning applications, a single magnet will suffice.

Figure 19:
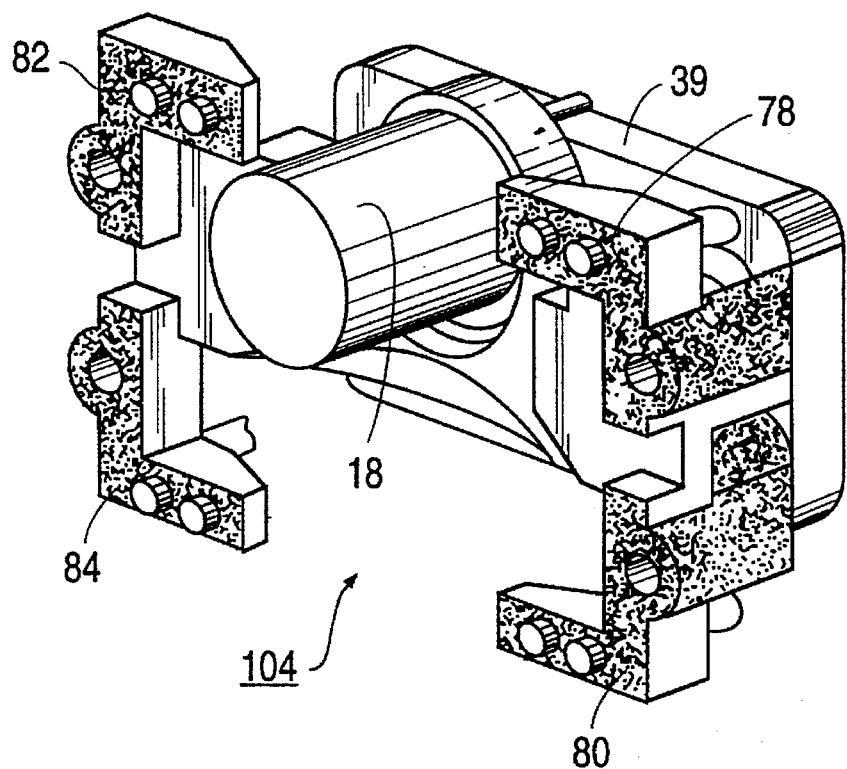
FIG. 19 is an isometric view of the rotor preform after plating of the circuits and attachment pads and prior to the second molding step, showing the surface circuitry and the relationship of the semiconductor laser unit and the coil to the laser body after final assembly.
Figure 20:
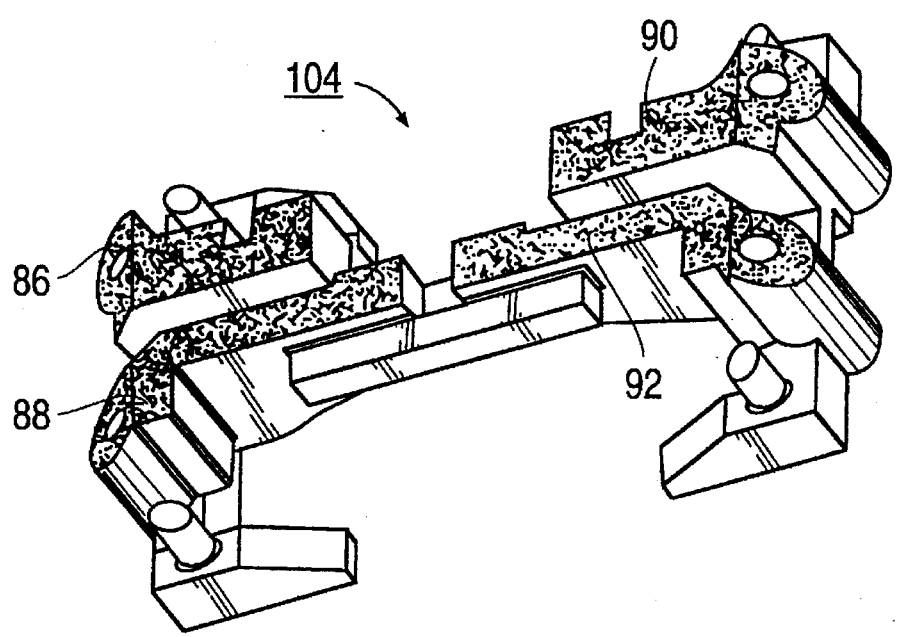
FIG. 20 is a rear isometric from below of the rotor preform of FIG. 19, showing the remainder of the surface circuitry.
Figure 21:
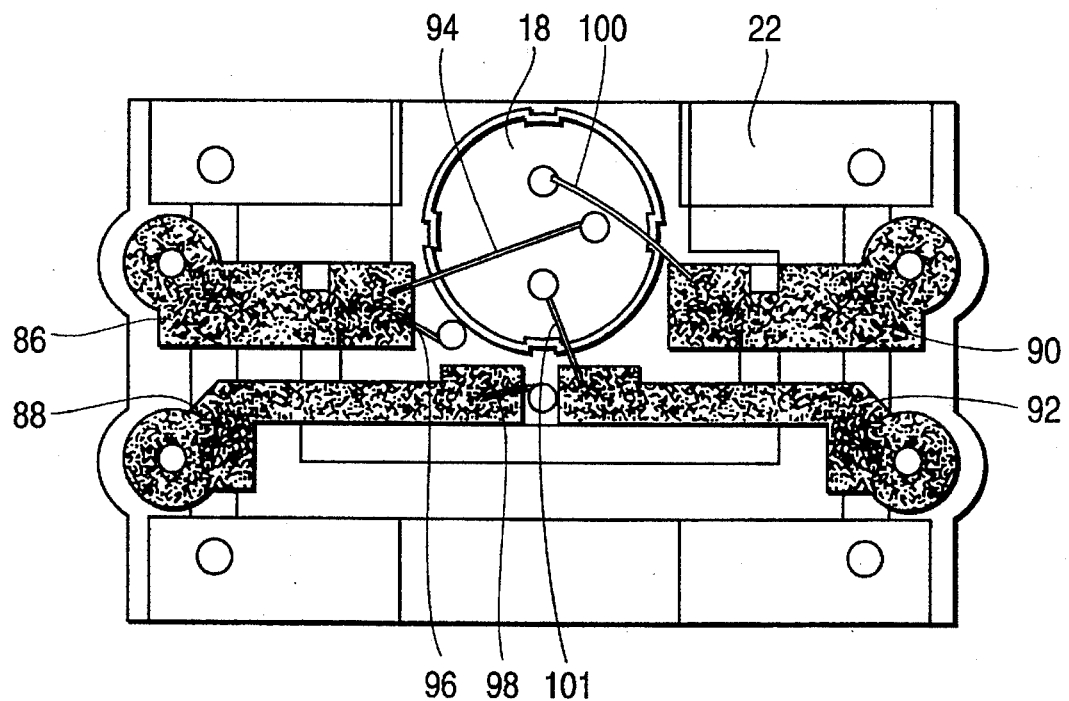
FIG. 21 is a rear elevational view showing the incorporation of the rotor preform of FIG. 20 into a fully molded rotor body like that shown in FIG. 7 and also showing the placement and electrical attachments of the semiconductor laser and the attachment points of the coil.

An important aspect of the subject invention is the structure of the stator and rotor bodies and the way in which electrical pathways are formed therein. At least one body, and preferably both bodies, of the scan engine is formed by a technique known as in-mold circuit definition, and the body is known as a molded interconnect device (MID). In a first molding shot, a catalytic grade resin (for example, Mindel ABS/PSF resin grade A-3760C available from Amoco or Ultem PEI resin grade D2313 available from GE Plastics is injection molded in one cavity of a mold to provide a three-dimensional preform having surfaces, frequently complex in shape, to carry the electrical circuitry. A rotor preform 104 in accordance with the invention is shown in FIGS. 19 and 20 (coil 39 and laser diode unit 18 are included in FIG. 19 for reference only and would not actually be installed at this point in the assembly of a rotor). The preform is chemically catalyzed to accept electroless plating. The circuit-bearing rotor preform is then mounted in proper location within a mold for the rotor body and non-conductive non-catalytic resin (for example, Mindel PSF resin grade S1000 available from Amoco, or Ultem PEI resin grade 1000 available from GE Plastics) is injection molded around the preform to provide a fully molded rotor body 22 having all the desired circuit paths defined by the exposed regions of the catalyzed preform. This two shot part is then plated with copper, nickel and gold to provide conductive paths on the exposed surface of the rotor.

Where connections to electrical components are required, conductive pads are left exposed at the surface of the rotor body and the component leads can be soldered directly to the pads. Also, mechanical electrical connections can be made to these pads. Such pads exist at several locations in both the rotor and the stator of a scan engine in accordance with the invention. On the stator, pads exist (not shown) to provide proper connection of the printed circuit boards to the circuitry cast within the stator. MID pathways connect the scan engine control circuitry to pads 70, 72, (and two other pads, not visible in the figures) which provide electrical continuity through flexures 40, 42, 44, and 46, respectively, being held in contact by jam clips 48 on posts 50 as described hereinabove. On the rotor, similar pads 78, 80, 82, and 84 make similar connections to the other ends of the same flexures, respectively. MID pathways within the rotor body connect the front rotor pads to corresponding rear rotor pads 86, 88, 90, and 92. Leads for the laser scanner and the oscillator coil are soldered directly to these pads. In a typical connection arrangement shown in FIG. 21 (coil 39 is omitted to permit viewing of the pads), pad 86 provides +5 v bias voltage to laser lead 94 and coil lead 96. Pad 88 provides an alternating drive voltage to the coil through coil signal lead 98 thereby causing the rotor body 22 to oscillate at the frequency of alternation. Pad 90 provides a control voltage to the laser diode in unit 18 through lead 100. Pad 92 provides a ranging signal to the controller on the stator from a monitor photodiode within laser diode unit 18 via lead 101. Thus electrical power or control signals can be transmitted to and from the scan engine controller on the stator to the semiconductor laser unit and the oscillator coil on the rotor without resort to wires and crimped or threaded connectors. This results in a substantial saving in weight of the rotor and improved ruggedness and reliability of both the rotor and the stator. Since the rotor scan rate equals the current alternation rate, and since the rotor is relatively light and has little inertia, the assembly can be made to scan at rates up to at least 18 Hertz, or 36 optical scans per second.

Signal discrimination in the scanner reader is enhanced through use of shielding around the scan engine to shut out stray electromagnetic noise. Shield 30, shown in FIG. 17, has bottom 28 and back 102 and interlocks with housing 14 to provide shielding from all sides of scanning unit 10 except for the scanning side.

From the foregoing description it will be apparent that there has been provided an improved miniature scan engine and scanning module for use in a bar code or other scanning application, wherein the oscillator has been improved through use of a single coil cutting two independent magnetic fields, and weight and inertia of the rotor have been reduced and circuitry improved through use of MID technology. Variations and modifications of the herein described scanning apparatus, in accordance with the invention, will undoubtedly suggest themselves to those skilled in this art. Accordingly, the foregoing description should be taken as illustrative and not in a limiting sense.

What is claimed is:

1. A scan engine for scanning an optical beam over a field of view which contains a data-representing symbol, collecting return light from said symbol, and translating said collected returning light into data-representing electrical signals, said scan engine comprising:

a stator having controlling means for electrically controlling said scan engine, a pair of magnets for producing a fixed magnetic field, a plurality of electrically-conductive flexures, and a photodetector disposed on said stator; and a rotor having a light source to provide said optical beam, an optical collector for collecting light returning from said field of view and for directing said collected returning light to said photodetector, and a coil having opposite sides and mounted on a support so that at least one side of said coil cuts said fixed magnetic field, each of said pair of magnets being disposed on said stator in magnetically coupled relationship with a different one of said opposite sides of said coil, said rotor being a molded interconnect device having conductors thereon to conduct electrical current from said flexures to said light source and to said coil whereby current in said coil is made to alternate, said light source and said optical collector being mounted on said rotor in fixed relationship, said rotor being supported by said flexures and adapted to oscillate in response to said controlling means about an axis which passes through said photodetector and said light source, said rotor being rotatable to provide said optical beam which scans said field of view.

2. The scan engine according to claim 1 wherein said controlling means comprises electronic circuitry connectable to a source of power.

3. The scan engine according to claim 2 wherein said electronic circuitry comprises a microchip.

4. The scan engine according to claim 2 wherein said source of power is a battery.

5. The scan engine according to claim 2 wherein said source of power is a line current.

6. The scan engine according to claim 1 wherein said electrically conductive flexures are formed from a metal alloy.

7. The scan engine according to claim 6 wherein said alloy comprises beryllium and copper.

8. The scan engine according to claim 1 wherein electrical communication between said stator and said rotor occurs through at least one of said flexures.

9. The scan engine according to claim 1 wherein said photodetector is a photodiode.

10. The scan engine according to claim 1 wherein said light source is a laser.

11. The scan engine according to claim 10 wherein said laser is a semiconductor diode.

12. The scan engine according to claim 1 wherein said optical collector is a mirror.

13. The scan engine according to claim 12 wherein said mirror is parabolic and impinges said collected returning light on said photodetector.

14. The scan engine according to claim 1 wherein said stator and said rotor comprise a nonconductive plastic resin.

15. The scan engine according to claim 1 wherein said conductors molded thereon are plated circuits.

16. The scan engine according to claim 1 wherein said stator is a molded interconnect device.

17. The scan engine according to claim 1 wherein said scan engine has a volume of less than about 1.25 cubic inches.

18. The scan engine according to claim 1 wherein said photodetector is shielded from electromagnetic noise.

19. The scan engine according to claim 1 wherein oscillation of said rotor has a period which can be varied by said controlling means.

20. The scan engine according to claim 1 wherein said coil has opposite sides and said magnetic field producing means comprises a pair of magnets, each disposed on said stator in magnetically coupled relationship with a different one of the opposite sides of said coil.

21. A scan engine for scanning an optical beam over a field of view which contains a data-representing symbol, collecting return light from said symbol, and translating said collected returning light into data-representing electrical signals, said scan engine comprising:

a stator having controlling means for electrically controlling said scan engine, a pair of magnets for producing a fixed magnetic field, a plurality of electrically-conductive flexures, and a photodetector disposed on said stator; and a rotor supported by said flexures, said flexures extending between said rotor and said stator on either side of an optic axis, said flexures positioned on a same side of said optic axis being substantially parallel, said rotor adapted to oscillate in response to said controlling means about an axis of rotation which passes through said photodetector, said rotor having a light source to provide said optical beam, an optical collector for collecting light returning from said field of view and for directing said collected returning light to said photodetector, and a coil having opposite sides and mounted on a support so that at least one side of said coil cuts said fixed magnetic field, each of said pair of magnets being disposed on said stator in magnetically coupled relationship with a different one of said opposite sides of said coil, said rotor being a molded interconnect device having conductors thereon to conduct electrical current from said flexures to said light source and to said coil whereby current in said coil is made to alternate, said light source and said optical collector being mounted on said rotor in fixed relationship, said rotor being rotatable to provide said optical beam which scans said field of view.

22. A scan engine for scanning an optical beam over a field of view which contains a data-representing symbol, collecting return light from said symbol, and translating said collected returning light into data-representing electrical signals, said scan engine comprising:

a stator having controlling means for electrically controlling said scan engine, a pair of magnets for producing a fixed magnetic field, a plurality of electrically-conductive flexures, and a photodetector disposed on said stator; and a rotor supported by said flexures, said flexures being connected between said rotor and said stator in a non-crossing arrangement, said rotor adapted to oscillate in response to said controlling means about an axis which passes through said photodetector, said rotor having a light source to provide said optical beam, an optical collector for collecting light returning from said field of view and for directing said collected returning light to said photodetector, and a coil having opposite sides and mounted on a support so that at least one side of said coil cuts said fixed magnetic field, each of said pair of magnets being disposed on said stator in magnetically coupled relationship with a different one of said opposite sides of said coil, said rotor being a molded interconnect device having conductors thereon to conduct electrical current from said flexures to said light source and to said coil whereby current in said coil is made to alternate, said light source and said optical collector being mounted on said rotor in fixed relationship, said rotor being rotatable to provide said optical beam which scans said field of view.

23. A scan engine for scanning an optical beam over a field of view which contains a data-representing symbol, collecting return light from said symbol, and translating said collected returning light into data-representing electrical signals, said scan engine comprising:

a stator having controlling means for electrically controlling said scan engine, a pair of magnets for producing a fixed magnetic field, a plurality of electrically-conductive flexures, and a photodetector disposed on said stator; and a rotor supported by said flexures and adapted to oscillate in response to said controlling means about an axis which passes through said photodetector, said rotor having a light source to provide said optical beam, an optical collector for collecting light returning from said field of view and for directing said collected returning light to said photodetector, and a single coil having opposite sides and mounted on a support so that at least one side of said single coil cuts said fixed magnetic field, each of said pair of magnets being disposed on said stator in magnetically coupled relationship with a different one of said opposite sides of said coil, said rotor being a molded interconnect device having conductors thereon to conduct electrical current from said flexures to said light source and to said single coil whereby current in said single coil is made to alternate, said light source and said optical collector being mounted on said rotor in fixed relationship, said rotor being rotatable to provide said optical beam which scans said field of view.

* * * * *